(12) United States Patent
Hammoud et al.

(10) Patent No.: US 11,429,856 B2
(45) Date of Patent: Aug. 30, 2022

(54) NEURAL NETWORKS ADAPTIVE BOOSTING USING SEMI-SUPERVISED LEARNING

(71) Applicant: International Business Machines Corporation, Armonk, NY (US)

(72) Inventors: Jamal Hammoud, Paris (FR); Marc Joel Herve Legroux, de Strasbourg Angers (FR)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 16/128,614

(22) Filed: Sep. 12, 2018

(65) Prior Publication Data

US 2020/0082260 A1   Mar. 12, 2020

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 5,422,983 A | 6/1995 | Castelaz et al. | |
| 5,822,742 A | 10/1998 | Alkon et al. | |
| 6,424,961 B1 | 7/2002 | Ayala | |
| 6,546,379 B1 | 4/2003 | Hong et al. | |
| 8,775,341 B1 | 7/2014 | Commons | |
| 2008/0071708 A1 | 3/2008 | Dara et al. | |
| 2009/0049002 A1* | 2/2009 | He | G06N 3/02 706/59 |
| 2013/0325776 A1 | 12/2013 | Ponulak et al. | |
| 2014/0164297 A1 | 6/2014 | Deolalikar et al. | |
| 2015/0220853 A1 | 8/2015 | Marcheret | |

(Continued)

OTHER PUBLICATIONS

Che, Z., Cheng, Y., Zhai, S., Sun, Z., & Liu, Y. (Nov. 2017). Boosting deep learning risk prediction with generative adversarial networks for electronic health records. In 2017 IEEE International Conference on Data Mining (ICDM) (pp. 787-792). IEEE. (Year: 2017).*

(Continued)

*Primary Examiner* — Kamran Afshar
*Assistant Examiner* — Lokesha G Patel
(74) *Attorney, Agent, or Firm* — Scott S. Dobson; Hunter E. Webb; Keohane & D'Alessandro, PLLC

(57) ABSTRACT

An approach for generating a trained neural network is provided. In an embodiment, a neural network, which can have an input layer, an output layer, and a hidden layer, is created. An initial training of the neural network is performed using a set of labeled data. The boosted neural network resulting from the initial training is applied to unlabeled data to determine whether any of the unlabeled data qualifies as additional labeled data. If it is determined that any of the unlabeled data qualifies as additional labeled data, the boosted neural network is retrained using the additional labeled data. Otherwise, if it is determined that none of the unlabeled data qualifies as additional labeled data, the neural network is updated to change a number of predictor nodes in the neural network.

19 Claims, 5 Drawing Sheets

(56) References Cited

U.S. PATENT DOCUMENTS

| | | | |
|---|---|---|---|
| 2017/0024641 A1 | 1/2017 | Wierzynski | |
| 2017/0177993 A1* | 6/2017 | Draelos | G06N 3/0454 |
| 2020/0020058 A1* | 1/2020 | Stauffer | G06F 16/345 |

OTHER PUBLICATIONS

Suganuma, M., Shirakawa, S., & Nagao, T. (2017, July). A genetic programming approach to designing convolutional neural network architectures. In Proceedings of the genetic and evolutionary computation conference (pp. 497-504). (Year: 2017).*
Wang, G., Xie, X., Lai, J., & Zhuo, J. (2017). Deep growing learning. In Proceedings of the IEEE International Conference on Computer Vision (pp. 2812-2820). (Year: 2017).*
Wikipedia, "Semi-supervised learning", Jan. 26, 2018, 7 pgs.
Wikipedia, "Atrificial neural network", Jan. 26, 2018, 23 pgs.

* cited by examiner

NEURAL NETWORKS ADAPTIVE BOOSTING USING SEMI-SUPERVISED LEARNING

TECHNICAL FIELD

In general, embodiments of the present invention relate to artificial intelligence (AI). Specifically, embodiments of the present invention relate to an approach for automatically creating a machine learning model for use in an AI system.

BACKGROUND

In today's information technology environment, more and more activities that were previously performed by humans can be performed more quickly and efficiently by computers. These activities can include such tasks as performing complex calculations, monitoring various conditions and/or events, controlling machinery, providing automated navigation, and/or the like. One area in which the use of computers is currently expanding is the use of artificial intelligence (AI) in solving problems.

One solution for performing (AI) and/or other complex computing tasks is a neural network. A neural network is a computing structure that is made up of a number of relatively simple but highly interconnected processing elements. To this extent, the structure of a neural network can be thought of as being loosely modeled after the structure of a brain of a living organism, particularly a mammal. In any case, most neural networks are organized in a number of layers, each of which has a number of computing nodes. These layers often include an input layer, a hidden layer that performs the actual processing, and an output layer.

Because of the structure and purpose of a neural network, the neural network is not programmed in a classical sense but is instead "trained" to do the task that it is designed to perform. Generally a training dataset having a relatively large number (e.g., millions) of data items having known outcomes is introduced to the neural network. A model validation technique is used for assessing how the results of a statistical analysis will generalize to an independent data set. Classically, conventional validation is used where the data set is partitioned into training and test sets or, alternatively, a cross validation technique can be used.

SUMMARY

In general, an approach for generating a trained neural network is provided. In an embodiment, a neural network, which can have an input layer, an output layer, and a hidden layer, is created. An initial training of the neural network is performed using a set of labeled data. The boosted neural network resulting from the initial training is applied to unlabeled data to determine whether any of the unlabeled data qualifies as additional labeled data. If it is determined that any of the unlabeled data qualifies as additional labeled data, the boosted neural network is retrained using the additional labeled data. Otherwise, if it is determined that none of the unlabeled data qualifies as additional labeled data, the neural network is updated to change a number of predictor nodes in the neural network.

A first aspect of the present invention provides a method for generating a trained neural network, comprising: creating a neural network; performing an initial training of the neural network using a set of labeled data; applying a boosted neural network to unlabeled data to determine whether any of the unlabeled data qualifies as additional labeled data; retraining, in response to a determination that any of the unlabeled data qualifies as additional labeled data, the boosted neural network using the additional labeled data; and updating, in response to a determination that none of the unlabeled data qualifies as additional labeled data, the neural network to change a number of predictor nodes in the neural network.

A second aspect of the present invention provides a computer program product for generating a trained neural network, the computer program product comprising a computer readable storage media, and program instructions stored on the computer readable storage media, that cause at least one computer device to: create a neural network; perform an initial training of the neural network using a set of labeled data; apply a boosted neural network to unlabeled data to determine whether any of the unlabeled data qualifies as additional labeled data; retrain, in response to a determination that any of the unlabeled data qualifies as additional labeled data, the boosted neural network using the additional labeled data; and update, in response to a determination that none of the unlabeled data qualifies as additional labeled data, the neural network to change a number of predictor nodes in the neural network.

A third aspect of the present invention provides a system for generating a trained neural network, comprising: a neural network having an input layer, an output layer, and a hidden layer; a memory medium comprising instructions; a bus coupled to the memory medium; and a processor coupled to the bus that when executing the instructions causes the system to: perform an initial training of the neural network using a set of labeled data; apply a boosted neural network to unlabeled data to determine whether any of the unlabeled data qualifies as additional labeled data; retrain, in response to a determination that any of the unlabeled data qualifies as additional labeled data, the boosted neural network using the additional labeled data; and update, in response to a determination that none of the unlabeled data qualifies as additional labeled data, the neural network to change a number of predictor nodes in the neural network.

BRIEF DESCRIPTION OF THE DRAWINGS

These and other features of this invention will be more readily understood from the following detailed description of the various aspects of the invention taken in conjunction with the accompanying drawings in which.

Figure 1:
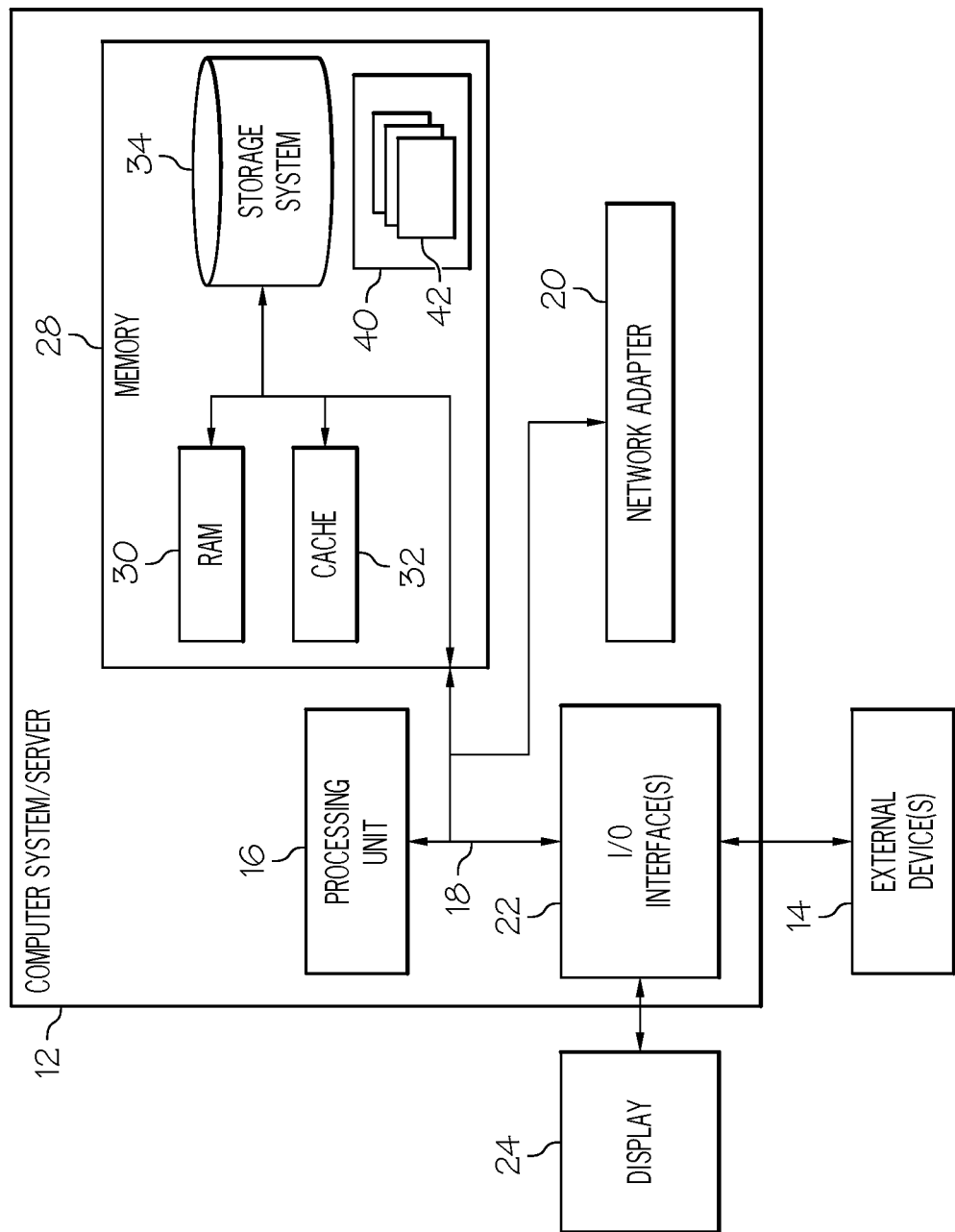
FIG. 1 depicts a computing environment according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for generating a trained neural network. In an embodiment, a neural network, which can have an input layer, an output layer, and a hidden layer, is created. An initial training of the neural network is performed using a set of labeled data. The boosted neural network resulting from the initial training is applied to unlabeled data to determine whether any of the unlabeled data qualifies as additional labeled data. If it is determined that any of the unlabeled data qualifies as additional labeled data, the boosted neural network is retrained using the additional labeled data. Otherwise, if it is determined that none of the unlabeled data qualifies as additional labeled data, the neural network is updated to change a number of predictor nodes in the neural network.

Referring now to FIG. 1, a schematic of an example of a computing environment is shown. Computing environment 10 is only one example of a suitable computing environment and is not intended to suggest any limitation as to the scope of use or functionality of embodiments of the invention described herein. Regardless, computing environment 10 is capable of being implemented and/or performing any of the functionality set forth hereinabove.

In computing environment 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and/or the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing environment 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM, and/or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
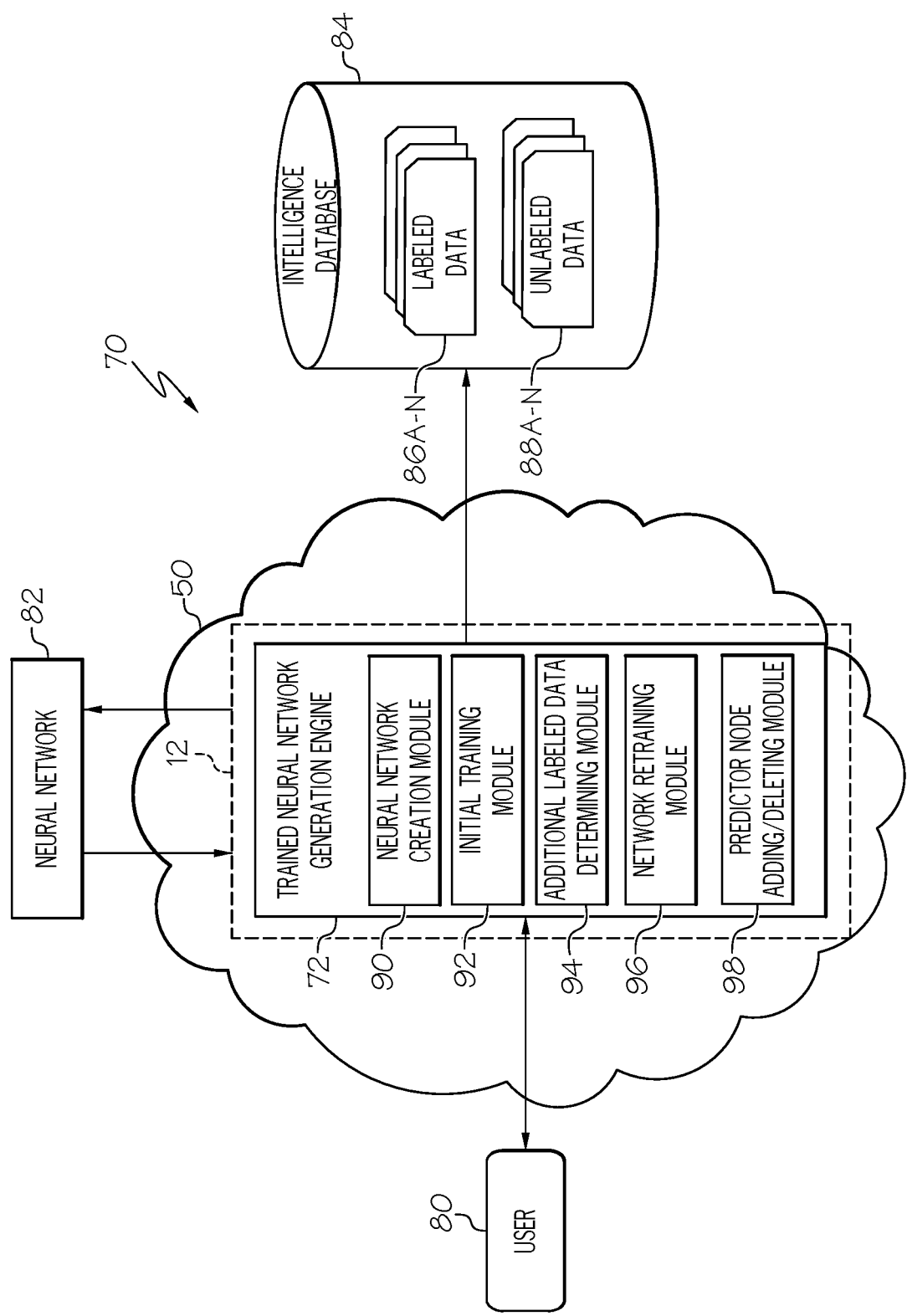
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each client need not have a trained neural network generation engine (hereinafter "system 72"). Rather, system 72 could be loaded on a server or server-capable device that communicates (e.g., wirelessly) with client machines to provide trained neural network generation therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to neural networks in a networked computing environment. Such other system(s) have not been shown in FIG. 2 for brevity purposes.

Along these lines, system 72 may perform multiple functions similar to a general-purpose computer. Specifically, among other functions, system 72 can generate a trained neural network 82. To accomplish this, system 72 can include: a neural network creation module 90, an initial training module 92, an additional labeled data determining module 94, a network retraining module 96, and a predictor node adding/deleting module 98.

Referring again to FIG. 2, neural network creation module 90 of system 72, as executed by computer system/server 12, is configured to create a neural network 82. To accomplish this, neural network creation module 90 can create a number of relatively simple processing elements (nodes), and these nodes can be connected to form the neural network. In an embodiment, some or all of these nodes can be dedicated hardware constructs with the software required to perform the necessary decision-making tasks executing thereon. Additionally, or in the alternative, some or all of these nodes can be software modules operating on one or more larger physical machines. In this case, the software modules can be encapsulated entities (e.g., virtual machines and/or the like) executing independently of, but in conjunction with, the other nodes in neural network. In either case, one or more nodes in neural network 82 can have a weight that is associated with the node itself and/or weights associated with one or more connections that connect the node with other nodes in neural network 82.

Figure 3:
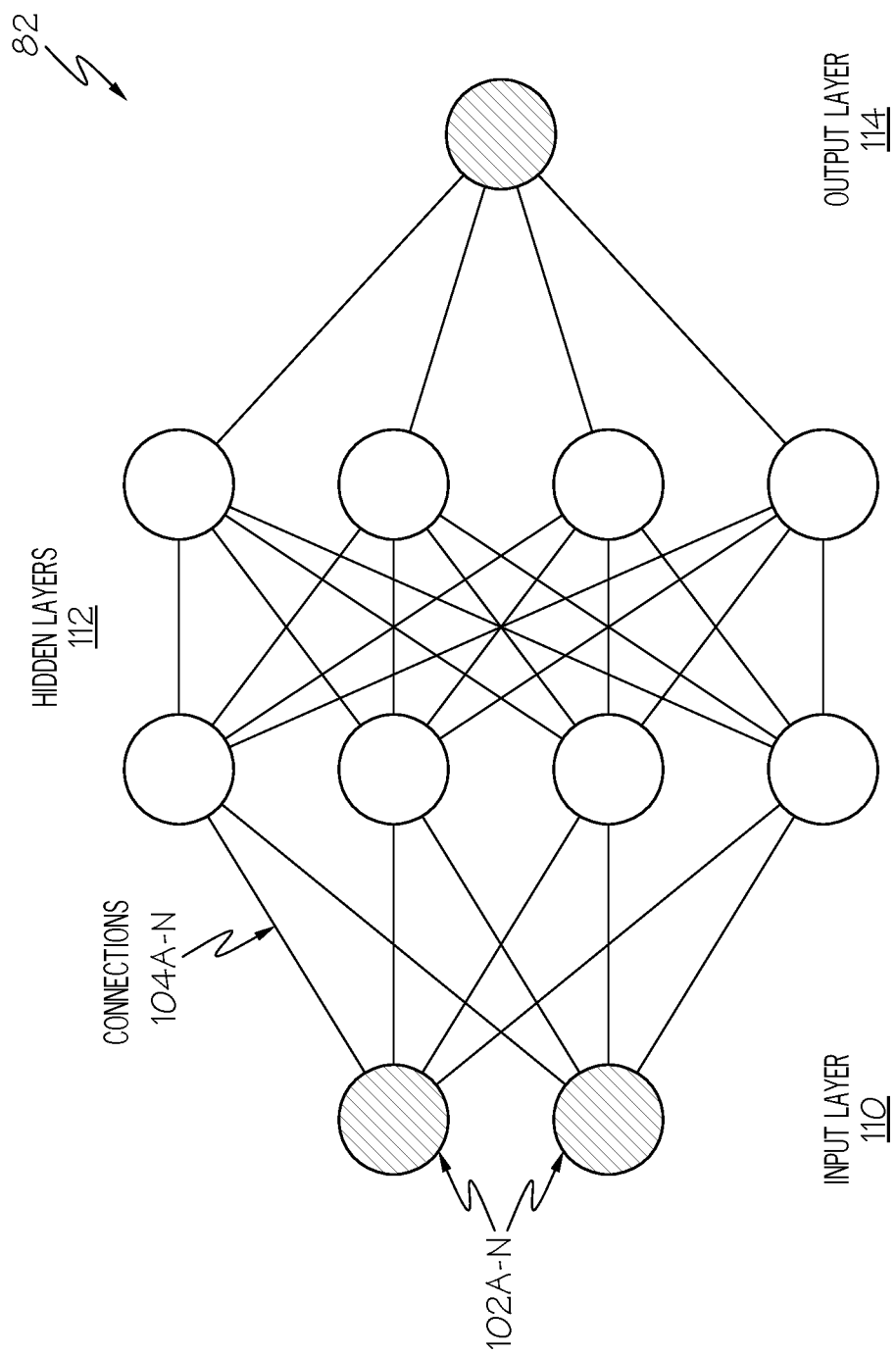
FIG. 3 depicts an example neural network according to an embodiment of the present invention.

Referring now to FIG. 3, an example neural network 82 is depicted according an embodiment of the present invention. Referring additionally to FIG. 2, as shown, neural network 82 (e.g., as created by neural network creation module 90) is made up of a plurality of nodes 102A-N (generically single 102N). In addition, neural network 82 contains connections 104A-N (generically single 104N) that link nodes 102A-N with one another. As shown, nodes 102A-N have been organized into three different layers, including an input layer 110, a number of hidden layers 112 (hereafter "hidden layer"), and an output layer 114. Input layer 110 is a mix of continuous and categorical predictors that provide an interface that receives data to be evaluated and feeds the data to hidden layer 112. Some or all of the nodes 102A-N in hidden layer 112 analyze the data using an activation function according to rules, procedures, algorithms, functions, equations, etc., contained within each node 102N in hidden layer 112. In an embodiment, the activation function of one or more nodes 102A-N can be a hyperbolic tangent function, while in other embodiments, the activation function of one or more nodes can be a function of a different type, including, but not limited to: an identity function, a binary step function, a bipolar step function, a sigmoidal function, a ramp function, and/or the like. In any case, the result of this analysis is forwarded to the output layer 114, which uses an identity function to output a solution based on the analysis. The result is a set of connected nodes 102A-N that have not yet been provided with instructions as to which connections 104A-N should be followed so that the chain of nodes 102A-N can be used to arrive at an accurate solution. In order to accomplish this, the newly created neural network 82 must be trained.

The inventors of the invention described herein have discovered certain deficiencies in the current solutions for creating neural network-based artificial intelligence machine learning models. Current deep learning and neural networks models are notable for doing straightforward pattern recognition. However, these current solutions are known to require enormous amounts of training data to reach satisfactory performance. This training data can often be particularly challenging, costly, sensitive, or time consuming to procure. Without this large scale training data, these models often fail to converge on their optimal settings and fail to perform well on complex tasks. To date, there has been no clear implementation of an automated or semi-supervised learning method that uses neural networks that emulates human intelligence and addresses the need to derive a best accurate estimate of model prediction performance using only a small training data set.

To this extent, the present invention enables neural and deep learning models to learn from very few examples, form an abstract model (i.e., a hierarchical representation of a hidden phenomenon or process) of a situation and achieve extreme generalization. A result is the generation of an intelligent application of a neural network architecture that enables the training and the evaluation of a predictive model on the fly using all the available data and without partitioning. The neural network is trained using an adaptive context that enhances the learning of artificial neural networks by performing feature selection and avoiding local optimum and that increases the accuracy and the stability of a predictive model even if applied on a relatively small sample of data.

Referring again to FIGS. 2 and 3, initial training module 92 of system 72, as executed by computer system/server 12, is configured to perform an initial training of neural network 82 using a set of labeled data 86A-N (generically 86N). Each instance of labeled data 86N is a previously prepared test case that includes not only the data that is to be input into neural network 82, but also the solution that the neural network 82 should arrive at after the data has been evaluated. To this extent, initial training module 92 simulates possible connection 104A-N paths by evaluating each instance of labeled data 86N over these connection 104A-N paths and obtaining results for each of the connection 104A-N paths. Based on the obtained results, initial training module selects the connection 104A-N paths that arrive at the solutions contained in the labeled data 86A-N. These selections are used to create and/or emphasize connections 104A-N between features represented by nodes 102A-N in neural network 82 that are more effective in determining the correct solution. Each of the features is an individual field or variable that is evaluated by the node 102N and that describes a state of an event, a product, a person (e.g., age, address, salary, etc.), or the like.

In an embodiment, each instance of labeled data 86N is introduced at input layer 110 of neural network 82. Nodes 102A-N of input layer 110 pass data of the instance of labeled data 86N to hidden layer 112, with the data being evaluated by at least one node 102N of hidden layer 112. Based on the evaluation, a solution is passed to and outputted by output layer 114. This solution is compared with a labeled solution that is associated with (e.g., included within) the instance of labeled data 86N. Based on the result of this comparison, any nodes 102A-N (e.g., the nodes themselves and/or the connections between the nodes) that evaluated (e.g., contributed in obtaining the solution for) the data of the instance of labeled data 86N can be weighted such that if the obtained solution matched the labeled solution, the nodes 102A-N involved in obtaining the solution would be weighted more heavily, whereas if the obtained solution varied from the labeled solution, these nodes would receive a less favorable weighting. The result is neural network 82 that has been "boosted" by the establishing and/or weighting of nodes 102A-N and their corresponding connections 104A-N.

Additional labeled data determining module 94 of system 72, as executed by computer system/server 12, is configured to generate additional labeled data 86A-N from unlabeled data. As stated above, generating labeled data using currently available solutions can be a tedious and time-consuming process. In order to minimize this time, initial training module 92 uses only a fraction of the amount of labeled data 86A-N required by conventional solutions to produce the boosted neural network 82. However, unlabeled data 88A-N is much easier to come by. Because of this, the present invention uses a small percentage (e.g., between approximately 10% and 20%) of the amount of labeled data 86A-N when compared to unlabeled data 88A-N in performing its training processes. Additional labeled data determining module 94 applies the boosted neural network 82 to instances of this unlabeled data 88A-N to determine whether any of the unlabeled data qualifies as additional labeled data (e.g., can be labeled and added to the set of labeled data 86A-N for the purpose of further training of the neural network 82). To accomplish this, all or a portion of the unlabeled data 88A-N, which may be many times the size of the set of labeled data 86A-N, is applied to the neural network 82. Each instance of the applied unlabeled data 88N is evaluated by neural network 82 to generate an outputted solution. This outputted solution is compared against an expected solution to determine whether the solution outputted by the neural network 82 for the evaluated instance of unlabeled data 88N is accurate. If it is determined that the solution outputted by the neural network 82 for the instance of unlabeled data 88N is accurate, that instance of unlabeled data 88N is labeled with the outputted solution to yield a labeled instance. All such labeled instances of previously unlabeled data 88A-N are added to the set of labeled data 86A-N for use in further training of the neural network 82. Because the number of instances of unlabeled data 88A-N may be many times larger than the original set of labeled data 86A-N, the new labeled data 86A-N generated by additional labeled data determining module 94 can potentially approach or exceed the original number of instances of labeled data 86A-N.

Network retraining module 96 of system 72, as executed by computer system/server 12, is configured to retrain neural network 82 using the newly generated labeled data 86A-N. Specifically, if additional labeled data determining module 94 has determined that any of unlabeled data 88A-N qualifies as additional labeled data 86A-N, this additional labeled data 86A-N can be applied to the previously boosted neural network. Based on the results of the evaluation, neural network 82 can be further boosted as previously described. In embodiments, only newly added labeled data 86A-N are used to reboost the neural network 82, while in other embodiments, both the original and newly added labeled data 86A-N can be utilized. However, in any case, the inclusion of the generated additional labeled data in the training process provides more variety to the data used to train the neural network 82 resulting in a faster and more effective training.

Predictor node adding/deleting module 98 of system 72, as executed by computer system/server 12, is configured to update the neural network 82 to change the number of predictor nodes in the neural network 82 in response to a determination that none of the unlabeled data qualifies as additional labeled data. For example, a number of iterations may be performed in which additional labeled data determining module 94 generates new labeled data 86A-N and this new labeled data 86A-N is used to further boost neural network 82. If, during one of these iterations, labeled data determining module 94 is unable to determine any new labeled data 86A-N that can be generated from the unlabeled data 88A-N, further attempts to boost neural network 82 based on the same group of labeled data 86A-N may not be productive. In order to remedy this, predictor node adding/deleting module 98 either adds or deletes one or more nodes.

The determination as to whether nodes are to be added or removed can be based on the number of nodes which are remaining in the hidden layer. For example, if the number of predictor nodes in the hidden layer is greater than a predetermined minimum allowed number, at least one predictor node can be removed from the hidden layer. In an embodiment, a determination is made as to which predictor nodes have the least filling rate, such that they include features that are used the least by neural network 82 in arriving at a solution. This can be determined by a comparison or the amount of boosting that has been done to each of the nodes, by detecting which predictor nodes have the lowest number of connections to other nodes within neural network 82, by monitoring the decision-making paths taken by neural network 82 to find the predictor nodes that are accessed the fewest number of time, or using any other solution now known or later developed in the art. In an embodiment, only one predictor node is removed while in other embodiments the number of predictor nodes removed can vary based on such factors as: the number of predictor nodes remaining in neural network (e.g., based on a percentage thereof, or the like), the number of iterations that have been performed, etc. In any case, what remains are the most important features used by the algorithm to reach the solution. The iteration process used to perform the training can then be resumed on restructured neural network 82.

Alternatively, if the number of predictor nodes in the hidden layer is at or below the predetermined minimum allowed number, at least one predictor node can be re-added to the hidden layer. Which node or nodes are re-added can be determined based on any number of criteria, including, but not limited to: first/last node removed, node whose removal caused the most/least change in the subsequent iteration, node having the highest ratio of boosting to number of iterations, and/or the like. Additionally or in the alternative, in an embodiment, new predictor nodes having categorical predictors that are based on other data sources can be added. In any event, once the predictor node or nodes have been re-added, a final boosting can be performed on neural network 82 based on the final set of labeled data 86A-N. Additionally, or in the alternative, in an embodiment, further training can be performed using new sets of labeled data 86A-N and/or unlabeled data 88A-N after training with the initial datasets has been completed.

Figure 4:
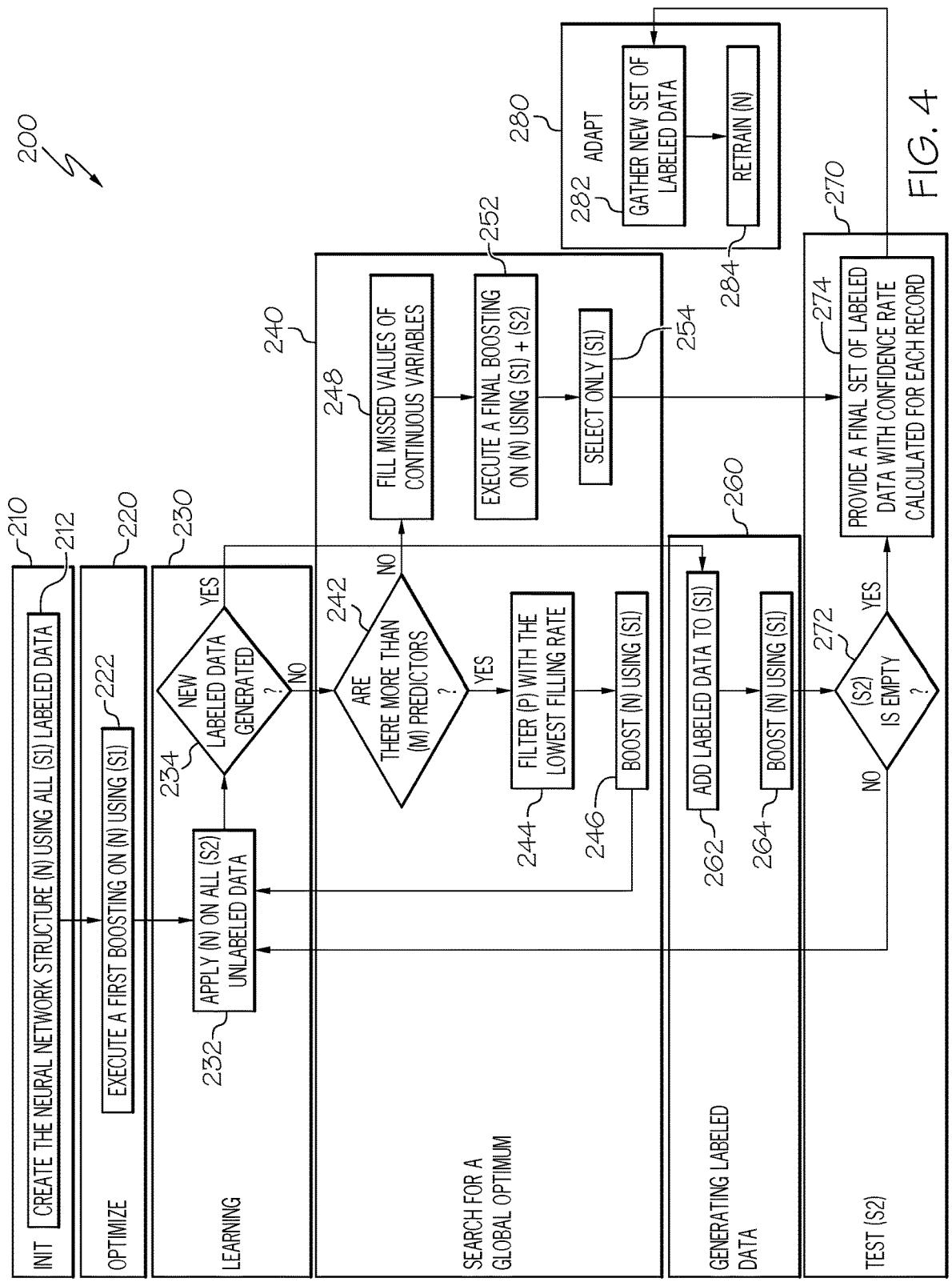
FIG. 4 depicts an example process flowchart according to an embodiment of the present invention.

Referring now to FIG. 4, a method flow diagram 200 according to an embodiment of the present invention is shown. Flow begins in an INIT 210 phase in which, at 212, a neural network structure (referenced for the purpose of this Figure as "N") is created using the set of all labeled data (referenced for the purpose of this Figure as "S1"). As stated previously, the teachings of this invention allow for the use of a relatively small set of labeled data compared to the amount that is necessary using conventional training techniques. Accordingly, assume for the purpose of this example that the number of instances in S1 is 100 and the number of instances in the set of unlabeled data (referenced for the purpose of this Figure as "S2") is 1000. Flow then proceeds to optimize phase 220 where in 222, a first boosting is executed on (N) using (S1).

Flow then proceeds to the iterative phases of learning 230, search for a global optimum 240, generating labeled data 260, and test 270. In 232, the neural network (N) is applied on all (S2) unlabeled data. In 234, a determination is made as to whether new labeled data can be generated from the applying of (S2) to (N). If it is determined in 234 that labeled data can be generated, flow proceeds to 262 in which the generated labeled data is added to (S1) and (N) is reboosted using (S1). If, at 272, it is determined that (S2) is not empty (e.g., there are remaining unlabeled data instances in (S2)), flow loops back to 232 where the remaining instances in (S2) are reapplied to (N). Otherwise, flow proceeds to 274, in which the final set of labeled data, with a confidence rate calculated for each record, is provided to training personnel.

Alternatively, if at 234 no new labeled data can be generated, a determination is made at 242 as to whether more than the minimum number (referenced for the purpose of this figure as "M") of predictor nodes (referenced for the purpose of this figure as "P") are present in the hidden layer. If there are more than (M) predictor nodes, P with the lowest filling rate is filtered (e.g., removed from (N)) at 244. The newly restructured (N) is then boosted using (S1) at 246 and flow loops back to 232 where the instances in (S2) are reapplied to (N).

Alternatively, if it is determined at 242 that the number of (P) is at (M), any values of continuous variables (e.g., (P) that were removed that should be reinserted) that were missed are filled (e.g., reinserted back into (N)) at 248. A final boosting is performed on (N) using both (S1) and (S2) at 252. At 254, (S1) is separated from any (S2) records and flow proceeds to 274, where the labeled data is provided to the training personnel (e.g., user 80 (FIG. 1)). Then, optionally, a new set of labeled data can be gathered at 282 and (N) can be retrained by beginning again at 232 using the new set of labeled data.

Figure 5:
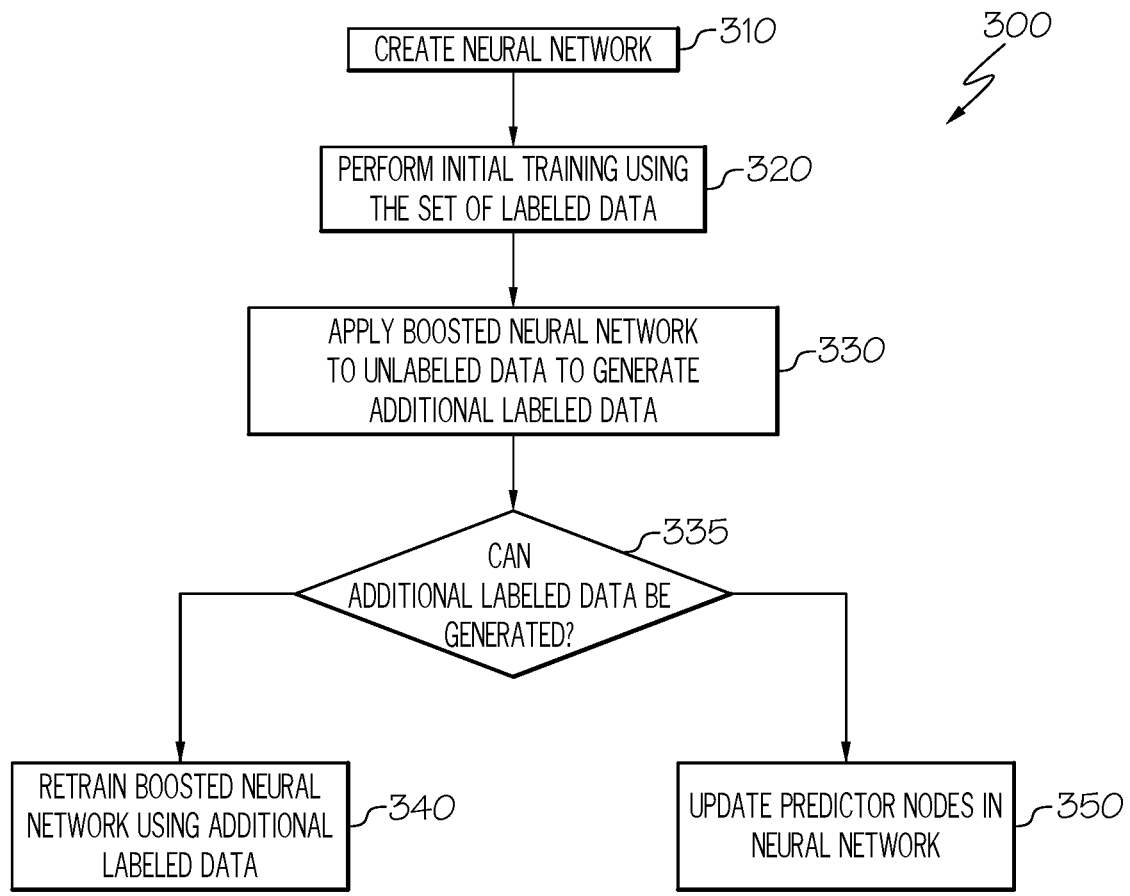
FIG. 5 depicts an example process flowchart according to an embodiment of the present invention.

Referring now to FIG. 5 in conjunction with FIG. 2, a method flow diagram 300 according to an embodiment of the present invention is shown. At 310, neural network creation module 90 of system 72, as executed by computer system/server 12, creates neural network 82. At 320, initial training module 92 of system 72, as executed by computer system/server 12, performs an initial training of neural network 82 using labeled data 86A-N. At 330, additional labeled data determining module 94 applies a boosted neural network 82 to unlabeled data 88A-N to determine whether any unlabeled data 88A-N qualifies (e.g., can be used to generate) additional labeled data 86A-N. If it is determined at 335 that additional labeled data can be generated, at 340, network retraining module 96 of system 72, as executed by computer system/server 12, retrains the boosted neural network using the additional labeled data 86A-N. Otherwise, at 350, predictor node adding/deleting module 98 of system 72, as executed by computer system/server 12, updates neural network 82 to change the number of predictor nodes in neural network 82 (e.g., one or more add predictor nodes to or deletes one or more predictor nodes from neural network 82).

The flowcharts of FIGS. 4 and 5 illustrate the architecture, functionality, and operation of possible implementations of systems, methods, and computer program products according to various embodiments of the present invention. In this regard, each block in the flowcharts may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for generating a trained neural network, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for responding to a threat. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for generating a trained neural network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for generating a trained neural network. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for generating a trained neural network, comprising:
   creating a neural network;
   performing an initial training of the neural network using a set of labeled data;
   performing a plurality of iterations in which a boosted neural network is applied to unlabeled data to determine whether any of the unlabeled data qualifies as additional labeled data;
   retraining, in response to performing of an iteration in which any of the unlabeled data qualifies as additional labeled data, the boosted neural network using the additional labeled data; and
   updating, in response to the performing of an iteration in which none of the unlabeled data qualifies as additional labeled data, the neural network to change a number of predictor nodes in the neural network, the updating further comprising removing at least one predictor node from a hidden layer of the neural network in response to a determination that the number of predictor nodes is greater than a predetermined number.

2. The method of claim 1, wherein the neural network includes an input layer, an output layer, and a hidden layer.

3. The method of claim 2, wherein the at least one predictor node includes a predictor node with a lowest filling rate.

4. The method of claim 2, the updating further comprising: re-adding at least one node to the hidden layer of the neural network in response to a determination that the number of predictor nodes has reached a predetermined number.

5. The method of claim 4, further comprising executing a final boosting on the neural network to finalize a structure of the neural network in response to the re-adding.

6. The method of claim 2, wherein the initial training includes, for each labeled instance of the set of labeled data:
   introducing the labeled instance at the input layer of the neural network;
   evaluating the labeled instance by at least one node of the hidden layer;
   outputting a solution at the output layer based on the evaluation;
   comparing the solution with a labeled solution associated with the labeled instance; and
   weighting the at least one node based on a result of the comparing to get the boosted neural network.

7. The method of claim 1, further comprising:
   determining, for each unlabeled instance of the unlabeled data, whether an outputted solution by the neural network is accurate;
   labeling, in response to a determination that the solution is accurate, the unlabeled instance with the outputted solution to yield a labeled instance; and
   adding the labeled instance to the set of labeled data.

8. A computer program product for generating a trained neural network, the computer program product comprising a computer readable storage media, and program instructions stored on the computer readable storage media, that cause at least one computer device to:
   create a neural network;
   perform an initial training of the neural network using a set of labeled data;

apply a boosted neural network to unlabeled data to determine whether any of the unlabeled data qualifies as additional labeled data;

retrain, in response to performing of an iteration in which any of the unlabeled data qualifies as additional labeled data, the boosted neural network using the additional labeled data; and update, in response to the performing of an iteration in which none of the unlabeled data qualifies as additional labeled data, the neural network to change a number of predictor nodes in the neural network, the update further causing the at least one computer device to remove at least one predictor node from a hidden layer of the neural network in response to a determination that the number of predictor nodes is greater than a predetermined number.

9. The computer program product of claim 8, wherein the neural network includes an input layer, an output layer, and a hidden layer.

10. The computer program product of claim 9, wherein the at least one predictor node includes a predictor node with a lowest filling rate.

11. The computer program product of claim 9, the instructions that cause the at least one computer device to update further causing the at least one computer device to re-add at least one node to the hidden layer of the neural network in response to a determination that the number of predictor nodes has reached a predetermined number.

12. The computer program product of claim 11, the instructions further causing the at least one computer device to execute a final boosting on the neural network to finalize a structure of the neural network in response to the re-adding.

13. The computer program product of claim 9, wherein the initial training includes, for each labeled instance of the set of labeled data:
   introducing the labeled instance at the input layer of the neural network;
   evaluating the labeled instance by at least one node of the hidden layer;
   outputting a solution at the output layer based on the evaluation;
   comparing the solution with a labeled solution associated with the labeled instance; and
   weighting the at least one node based on a result of the comparing to get the boosted neural network.

14. The computer program product of claim 8, the instructions further causing the at least one computer device to parse, prior to forming a machine language model, annotated documents to remove from a document unannotated portions of the document.

15. A system for generating a trained neural network, comprising:

a neural network having an input layer, an output layer, and a hidden layer;

a memory medium comprising instructions;

a bus coupled to the memory medium; and a processor coupled to the bus that when executing the instructions causes the system to:

perform an initial training of the neural network using a set of labeled data;

apply a boosted neural network to unlabeled data to determine whether any of the unlabeled data qualifies as additional labeled data;

retrain, in response to performing of an iteration in which any of the unlabeled data qualifies as additional labeled data, the boosted neural network using the additional labeled data; and update, in response to the performing of an iteration in which none of the unlabeled data qualifies as additional labeled data, the neural network to change a number of predictor nodes in the neural network, the update further causing the system to remove at least one predictor node from a hidden layer of the neural network in response to a determination that the number of predictor nodes is greater than a predetermined number.

16. The system of claim 15, the instructions that cause the system to update further causing the system to re-add at least one node to the hidden layer of the neural network in response to a determination that the number of predictor nodes has reached a predetermined number, the at least one predictor node includes a predictor node with a lowest filling rate.

17. The system of claim 16, the instructions further causing the at least one computer device to executing a final boosting on the neural network to finalize a structure of the neural network in response to the re-adding.

18. The system of claim 15, wherein the initial training includes, for each labeled instance of the set of labeled data:
   introducing the labeled instance at the input layer of the neural network;
   evaluating the labeled instance by at least one node of the hidden layer;
   outputting a solution at the output layer based on the evaluation;
   comparing the solution with a labeled solution associated with the labeled instance; and
   weighting the at least one node based on a result of the comparing to get the boosted neural network.

19. The system of claim 15, the instructions further causing the system to train the artificial intelligence using a machine learning model.

* * * * *